United States Patent [19]

Charlebois et al.

[11] Patent Number: 4,549,039

[45] Date of Patent: Oct. 22, 1985

[54] TELECOMMUNICATIONS CABLE SPLICE CLOSURES

[75] Inventors: Leonard J. Charlebois; James E. Anderson, both of Ontario, Canada

[73] Assignee: Northern Telecom Limited, Montreal, Canada

[21] Appl. No.: 503,359

[22] Filed: Jun. 10, 1983

[51] Int. Cl.⁴ .................. H02G 15/08; G01V 3/10; G01R 19/145
[52] U.S. Cl. .................................... 174/72 R; 156/49; 174/88 R; 324/67; 324/326
[58] Field of Search ................ 174/70 R, 71 R, 72 R, 174/88 R; 156/49; 324/67, 326

[56] References Cited

U.S. PATENT DOCUMENTS 4,055,796  10/1977  Nelson ............................... 324/326
4,322,573  3/1982  Charlebois ....................... 174/72 R Primary Examiner—Laramie E. Askin
Attorney, Agent, or Firm—R. J. Austin

[57] ABSTRACT

Telecommunications cable with a splice closure covering conductors which have been severed and each having one severed end electrically connected to another cable. The other severed ends of the conductors are placed in series with a coil formed of electrical windings to enable a current to be passed through the coil by passing it through the electrically "dead" parts of the conductors to create an electromagnetic field around the coil to indicate the splice position. Preferably, the coil is formed by windings passing around the cable and these windings may be embedded in the closure.

8 Claims, 3 Drawing Figures

TELECOMMUNICATIONS CABLE SPLICE CLOSURES

This invention relates to telecommunications cable splice closures.

In the use of underground telecommunications cable, splices are formed in buried feeder cable to provide dropwires for connection to customers' phones, two dropwires to each phone. The splices are formed and closed by any suitably chosen method to ensure that the wire connections within each splice and any opening made into the cable for access to the wires are protected against ingress of moisture from the surrounding soil.

Sometimes it is necessary for a buried splice to be located, possibly for maintenance, repair, or to connect a new phone installation with a spare pair of dropwires extending from the splice. While the approximate location of a buried splice may be known, knowledge of its exact location enables the smallest hole to be dug down to expose it and consistent with providing sufficient room in which a workman may operate. Otherwise, extra time, trouble and expense is wasted in digging oversize holes primarily to find the exact location of the splice.

Up to the present, two methods have been used for locating a buried splice. In a feeder cable, when two dropwires are selected to extend from any splice, this task is performed by severing two conductors of the cable at the splice and connecting upstream ends of the conductors to the dropwires. Downstream portions of these conductors (i.e. away from the switching office) cannot then be used for telecommunications purposes. In one method of locating the buried splice, the severed ends of these downstream portions are electrically connected together within the splice. A known current is then passed through the closed loop formed by these downstream portions from a suitable downstream position, e.g. from a buried cable terminal extending above ground level. Resistance measurements are then taken and from this the distance of the splice from the electrical power source is determined. It is then necessary to measure this distance along the path of the buried cable to locate the buried splice. While this appears to be a good method in theory, errors in splice location do occur thus resulting in wastage in time, effort and expense already referred to. These errors occur rainly in cases where the cable has not been installed in a straight line. Above ground measurements therefore requires extremely accurate location of the path of the buried cable as it proceeds around curves, otherwise the final determined location of a splice may be a significant distance from where it actually is.

In the second method of splice location, when the splice is installed and buried, a peg is also buried in the ground at the splice location. This peg carries resistance windings on a ferrite rod and a capacitor. To locate the splice, a live electrical transmitter is moved across the ground area so that a current is induced in the windings thus creating an electromagnetic field around them. A receiver then receives signals indicating the source of the field and the splice location is accurately determined. A main disadvantage, however, is that the device used to create the field, i.e. the peg, ferrite core, windings and capacitor are expensive.

The present invention provides cable splice closure in which the splice, when buried, is easily and accurately locatable and which avoids the cost required in locating the splice by the second method described above. Also, the invention provides a method of locating a buried splice.

According to one aspect of the present invention, a telecommunications cable has a plurality of insulated conductors and a splice closure comprising at least two insulated conductors which are severed at the splice to electrically disconnect first parts of these conductors extending from the splice region in one axial direction from second parts extending in the other axial direction, each of said first parts having an electrical connection to an insulated conductor of another cable, a closure around the cable splice area to prevent moisture access to the inside of the cable or to bared electrical conductors at the connection, and a plurality of electrical conductor windings to provide a coil which is electrically connected between and in series with said second conductor parts.

In the above cable according to the invention, it is preferable to provide the coil by forming the conductor windings around the cable itself. Alternatively, but less conveniently, the coil may be spaced away from the cable. When the coil surrounds the cable, it is preferred to locate the coil within the closure with the splice. In this case, the closure must be formed from non-electrically conducting materials, such as polymeric material or materials. Alternatively, the coil may surround the closure which may then be formed of any convenient material.

The invention also includes a method of making a splice closure in a telecommunications cable comprising:

selecting two insulated conductors of the core of the cable and severing the conductors at a splice region to electrically disconnect first parts of these conductors extending from the splice region in one axial direction from second parts extending in the opposite axial direction; electrically connecting in series between the second conductor parts a plurality of electrical conductor windings to provide a coil between said second parts, the first conductor parts being for electrical connection to an insulated conductor of another cable; and forming a closure around the splice region either before or after connecting the coil in series with the second conductor parts.

One embodiment of the invention will now be described, by way of example, with reference to the accompanying drawings, in which.

Figure 1:
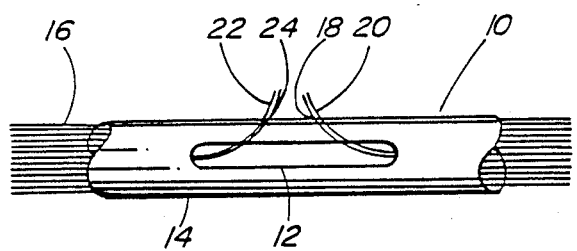
FIG. 1 is a side elevational view of part of a cable showing commencement of a splicing operation.

In the embodiment, a main telecommunications cable 10 has a slit 12 formed for a certain length through its jacket and sheath 14 to enable a pair of wires to be pulled from the core 16 for the purpose of severing the wires to form dropwires 18 and 20 for connection to a service wire as will be described. Upon cutting through these two conductors to form the dropwires 18 and 20, there are provided two electrically dead portions of these conductors, 22 and 24, extending axially away from the slit 12 in the opposite direction from the dropwires 18 and 20.

Apart from the incorporation of windings of electrical conductor into the splice closure to be made, the splice closure, which is now to be described, is made along the lines described in U.S. Pat. No. 4,322,573, granted Mar. 30, 1982 to L. J. Charlebois and entitled "Encapsulation of Telecommunications Cable Splices". A service wire 26 enters the closure and lies radially outwards from a layer of sealing material which sealingly encloses a ground clamp 28, the clamp being connected to a ground wire 30 extending from the service wire. The ground clamp 28 is attached to the metal sheath of the cable at one side of the slit 12 for grounding purposes in the manner described in the aforementioned U.S. Patent Specification. A layer of sealing material 25 surrounds the ground clamp 28. This sealing material comprises overlapped wrappings of ethylene-propylene rubber sealing tape, which extend completely around the main cable 10 along the axial region of the slit 12 and slightly to each side. A connector 32 connects the two wires 18 and 20 with two wires 34 and 36 of the service cable 26. The two wires 18 and 20 project through the wrappings 25 so that the connector 32 lies on the outside of the wrappings 25 as described in the aforementioned specification.

Figure 2:
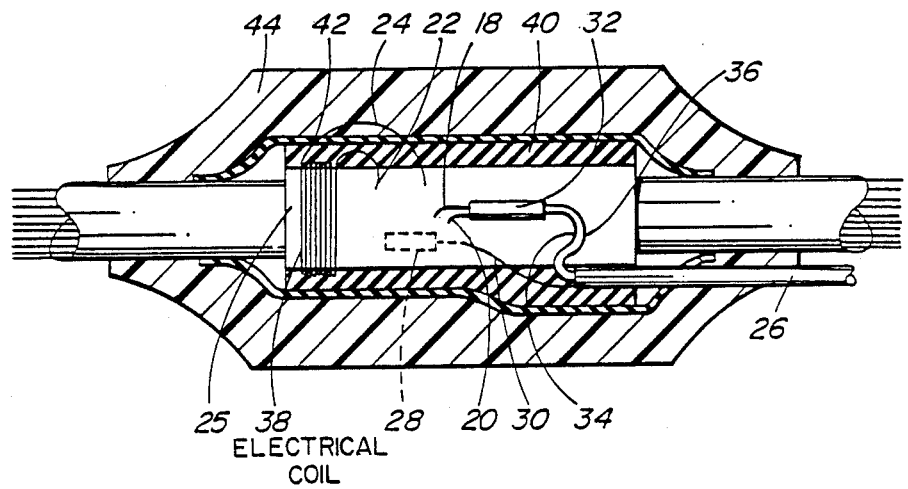
FIG. 2 is a side elevational view of the cable and a finished splice closure which is partly in section.

The embodiment and the invention differ from the embodiment and invention described in the aforementioned specification in the use of a coil 38, which is formed from windings of an electrical conducting wire which are wound around the wrapping 25, the two ends of the windings being connected to the two dead conductor portions 22 and 24 which also project through the wrapping 25 for connecting purposes. This is shown by FIG. 2. The splice closure is then completed in the manner described in the aforementioned specification. Completion of the closure entails further wrappings 40 and 42, the wrappings 40 also being formed from ethylene-propylene sealing tape, which lie over the wrappings 25. The wrappings 42 are provided by overlapped glass tape, which completely surrounds the wrappings 25 and 40 and extends axially beyond the ends of these wrappings so as to contact the outer sheath 14 of the main cable as shown in FIG. 2.

The splice closure is then completed by an encapsulation 44 which completely covers the sealing and glass tape layers and extends axially beyond their ends so as to be bonded to the outer surface of the jacket material. The sheath is formed by a moulding process in the manner described in U.S. Pat. No. 4,322,573. The material used for the encapsulation is preferably polyethylene, but other suitable encapsulating material may be used instead. These materials include ethylene acrylic acid and an ionomer resin derived from ethylene/methacrylic acid copolymer such as sold under the trademark "Surlyn" by Dupont under product numbers 1652 and 1702.

During cooling, the shrinkage of the encapsulation compresses the sealing tape and causes it to become shaped intimately and fluid tight in sealing contact with the connection 32 and bared wired conductors of the pairs 18, 20 and 34, 36. Fluid tight sealing engagement is also provided between the sealing layer and ground clamps and earth wires and around the outer sheath of cable 10 and the insulated regions of the pairs.

The shrinkage also causes the intimate shaping and fluid tight sealing of the wrapping layers 25 and 40 around the wire ends 22 and 24, together with their bare wire connections to the windings of the coil 38. This too is intimately enshrouded by the wrappings 25 and 40.

Figure 3:
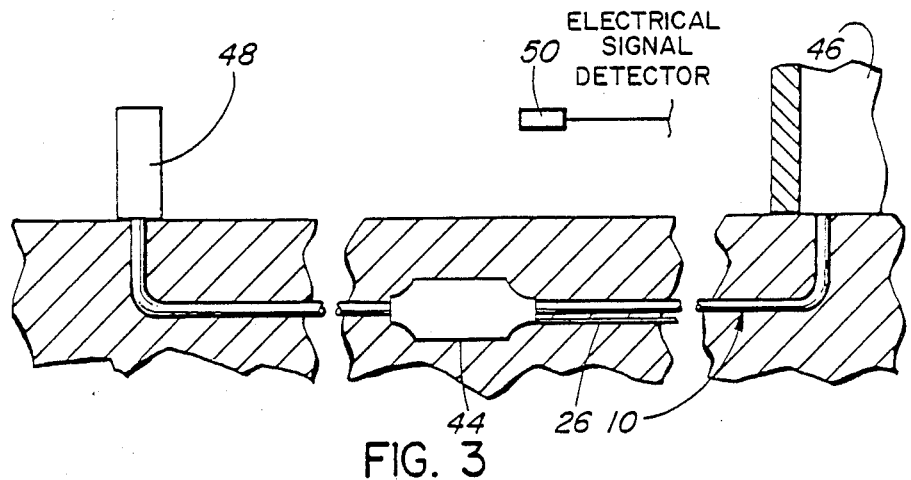
FIG. 3 is a diagrammatic view of an installed buried cable and showing the method used for its location.

In use, the cable 10 is installed beneath the ground surface with splice closures similar to that described with reference to FIGS. 1 and 2, each closure having an encapsulation 44. In each splice closure the wires 18 and 20 which are connected to the service wire 26 extend to the switching office 46 (FIG. 3). The wires 22 and 24 of each closure extend in the opposite axial direction to terminate at some above ground position, for instance, an above ground pedestal 48 as shown by FIG. 3.

In the event that the position of any splice closure needs to be located accurately below the ground for unearthing purposes, then this is easily accomplished by the following procedure. The dead wires for the particular splice which needs to be located, i.e. wires 22 and 24, are identified at the above ground position, i.e. at the pedestal, and an electrical current is passed through one of the wires, say wire 22, and this current passes through the coil 38 and returns along the cable down wire 24 to the pedestal position, the wire 24 being grounded. Passage of the current through the coil 38 creates an electromagnetic field surrounding the coil and this field is identified by the use of a conventional electrical signal detector 50, which is moved, possibly by hand, across the surface of the ground. This detector may comprise a ferrite rod antenna which is wound with turns of copper wire. An electrical conductor connected to the detector is connected to a meter which registers the field strength. Movement of the detector horizontally will show the position of the center of the magnetic field directly below the detector. This position indicates the location of the coil and thus of the splice closure vertically beneath the detector.

As can be seen, the above encapsulated splice closure containing the wound coil connected to the dead pair of conductors provides an extremely cheap construction to enable the creation of an electromagnetic field for the purposes of closure location. Clearly the cost of positioning a winding formed from an insulated electrical conductor which is connected to the dead pair of conductors is far less than would be the case for a conventional structure for splice location, i.e. that using a peg buried at the splice location and carrying resistance windings with a capacitor. By passage of the current through the dead pair of wires into the coil and picking up a signal from the electromagnetic field, the position of the splice is as positively located as with the use of the peg locator which requires a live electrical transmitter above the ground to induce a current in the windings. Apart from the question of cost which is reduced with the described embodiment and also with the invention, the coil is easily accommodated in the splice enclosure and is more conveniently buried as a unit beneath the ground than in the previous method which required the separate peg and resistance windings assembly. A further advantage, of course, is that no new location equipment is required for finding the position of the splice, as conventional electrical current producing equipment and location devices may be used for the purpose.

The structure according to the embodiment is not, of course, limiting to the scope of the present invention. The present invention envisages the use of a coil which is connected to the dead conductor wires, e.g. as wires 22 and 24 in the embodiment. This coil may be wrapped around the cable as described in the embodiment and encapsulated within the closure. With this arrangement it is necessary for the closure to be completely devoid of magnetic material surrounding the coil within the splice as this would affect the generation of the electromagnetic field. However, in an alternative arrangement, the coil is located around the outside of the formed closure and is connected through the closure to the dead conductor wires. In this case, it may not be necessary to completely avoid the use of magnetic materials in the closure.

As a further alternative, a coil may be formed which lies alongside the closure but does not form part of it. In this case it would be preferable to provide some means of lashing the coil to the closure or to the cable in a position adjacent the closure. Also, a commercially available formed coil may be found to be suitable for this purpose. This modification, however, has the disadvantage that it is bulky and cumbersome compared to an arrangement in which the coil surrounds the cable as in the embodiment described.

In constructions according to the invention and as described in the embodiment, the formation of the coil by hand is a simple procedure. All that is required is to position the windings in the coil as closely together as possible, for instance, as shown in FIG. 2, and a few windings will produce the desired result. On the basis that the field strength of the magnetic field increases proportionately as a square of the number of turns of insulated wire, then 7 turns has been found to produce a field strength which has increased from a single turn by 49 times. On the other hand, 10 turns of windings for the coil will produce a field strength which is a 100 times that of a single turn. Thus only a short length of wire is necessary for the formation of the turns and these are easily and quickly produced by the skilled man forming the splice.

What is claimed is:

1. A telecommunications cable having a plurality of insulated conductors and a splice closure comprising at least two insulated conductors which are severed at the splice to electrically disconnect first parts of these conductors extending from the splice region in one axial direction from second parts extending in the other axial direction, each of said first parts provided to have an electrical connection to an insulated conductor of another cable, a closure around the cable splice region to prevent moisture access to the inside of the cable or to bared electrical conductors at the connection, and a plurality of electrical conductor windings providing a coil which is electrically connected between and in series with said second conductor parts.

2. A cable according to claim 1 wherein the coil surrounds the cable by the conductor windings extending around the cable.

3. A cable according to claim 2 wherein the coil is disposed within the bounds of the closure with any part of the closure outwardly of the coil being devoid of magnetic or electrically conductive material.

4. A cable according to claim 3 wherein the splice closure comprises a moulded encapsulation of moulded material surrounding the coil.

5. A method of making a splice closure in a telecommunications cable comprising:

selecting two insulated conductors of the core of the cable and severing the conductors at a splice region to electrically disconnect first parts of these conductors extending from the splice region in one axial direction from second parts extending in the opposite axial direction; electrically connecting in series between the second conductor parts, a plurality of electrical conductor windings to provide a coil between said second parts, the first conductor parts provided for electrical connection to an insulated conductor of another cable; and forming a closure around the splice region either before or after connecting the coil in series with the second conductor parts.

6. A method according to claim 5 wherein the coil is formed by passing the electrical conductor windings around the cable so that the coil surrounds the cable.

7. A method according to claim 6 comprising locating the coil within the bounds of the closure and forming all parts of the closure outwardly of the coil from material which is devoid of magnetic or electrically conductive material.

8. A method according to claim 7 comprising forming parts of the closure surrounding the coil from a moulded encapsulation of moulded material.

* * * * *